US012313014B1

(12) United States Patent
Morreale et al.

(10) Patent No.: US 12,313,014 B1
(45) Date of Patent: May 27, 2025

(54) SYSTEM AND METHOD FOR AN ELECTRONIC PRESSURE CONTROLLED SUPERCHARGER

(71) Applicants: Robert Sal Morreale, Brooksville, FL (US); Michael James Black, Brooksville, FL (US)

(72) Inventors: Robert Sal Morreale, Brooksville, FL (US); Michael James Black, Brooksville, FL (US)

(73) Assignee: The Tuning School, Inc, Brooksville, FL (US)

( * ) Notice: Subject to any disclaimer, the term of this patent is extended or adjusted under 35 U.S.C. 154(b) by 0 days.

(21) Appl. No.: 18/637,831

(22) Filed: Apr. 17, 2024

(51) Int. Cl.
*F02D 41/00* (2006.01)
*F02B 37/22* (2006.01)
*F02B 77/08* (2006.01)

(52) U.S. Cl.
CPC ........ *F02D 41/0007* (2013.01); *F02B 37/225* (2013.01); *F02B 77/08* (2013.01); *F02D 2200/023* (2013.01); *F02D 2200/0404* (2013.01); *F02D 2200/0406* (2013.01); *F02D 2200/0414* (2013.01); *F02D 2200/501* (2013.01); *F02D 2200/703* (2013.01)

(58) Field of Classification Search
CPC ........... F02D 41/0007; F02D 2200/023; F02D 2200/0404; F02D 2200/0406; F02D 2200/0414; F02D 2200/501; F02D 2200/703; F02B 37/225; F02B 77/08
USPC .......................................................... 123/564
See application file for complete search history.

(56) References Cited

U.S. PATENT DOCUMENTS 4,724,817 A * 2/1988 Cook ...................... F02B 39/10 123/565
5,214,919 A * 6/1993 Jiewertz .................. F02B 37/18 60/602
6,810,667 B2 * 11/2004 Jung ..................... F02B 37/183 251/61.3
7,299,122 B2 * 11/2007 Perkins ................ F02M 31/083 60/599
2010/0024786 A1 * 2/2010 Robinson ............ F02D 41/0007 123/564

* cited by examiner

*Primary Examiner* — J. Todd Newton
(74) *Attorney, Agent, or Firm* — Sam Pierce

(57) ABSTRACT

An electronic supercharger pressure control system for internal combustion engines, designed to enhance engine performance by precisely regulating the boost pressure to user-defined levels. The system features an electronic servo actuator connected to a supercharger pressure relief valve, allowing for dynamic adjustment of the valve's position to control boost pressure accurately. A manifold air pressure sensor measures air pressure, providing feedback to an electronic control unit. The electronic control unit is further linked to a user input device equipped with a potentiometer knob and button, enabling the user to set and adjust the desired boost pressure level easily. The system operates by receiving and analyzing manifold air pressure signals and user-defined boost settings, adjusting the relief valve via the servo actuator to maintain boost pressure within a specific range.

18 Claims, 4 Drawing Sheets

100

When the onboard Manifold pressure sensor meets the correct conditions, the servo linkage will begin to push on the supercharger pivot, closing the supercharger valve. It will continue to close the valve until the desired pressure level is met. Once the desired pressure level is met, the servo will adjust the valve angle to maintain pressure within 1 PSI of desired pressure.

FIG. 1

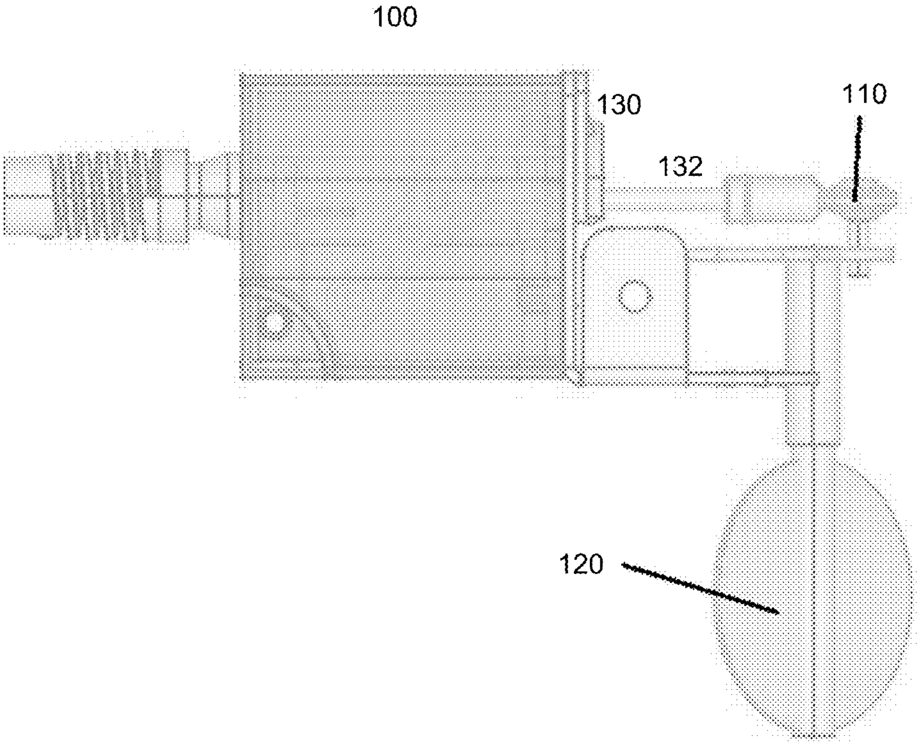

When the onboard Manifold pressure sensor meets the correct conditions, the servo linkage will begin to push on the supercharger pivot, closing the supercharger valve. It will continue to close the valve until the desired pressure level is met. Once the desired pressure level is met, the servo will adjust the valve angle to maintain pressure within 1 PSI of desired pressure.

The desired pressure is set by turning the potentiometer knob clockwise (more pressure) or counter-clockwise (less pressure). The control panel also includes a button that will rapidly close the supercharger valve once the intake manifold atmospheric conditions are met.

SYSTEM AND METHOD FOR AN ELECTRONIC PRESSURE CONTROLLED SUPERCHARGER

BACKGROUND

The present invention relates to the field of internal combustion engines, and more specifically to a system and method for electronically controlling the boost pressure produced by a supercharger.

Superchargers are commonly used to increase the power output of internal combustion engines by compressing the intake air to higher than atmospheric pressure, allowing more air and fuel to enter the engine. Conventional supercharger control systems, such as that described in U.S. Pat. No. 7,591,254 use mechanical or electromagnetic clutch systems to engage and disengage the supercharger from the engine crankshaft. However, these systems can be inefficient and only provide on/off control of the supercharger. Other approaches, like the comprex supercharger control system of U.S. Pat. No. 4,563,997 uses a control valve to regulate exhaust gas flow to the supercharger turbine and control the intake manifold pressure. The system monitors intake pressure and engine speed to adjust the control valve. However, this system lacks direct, precise control of the supercharger boost pressure.

While the prior art systems allow for some level of supercharger control, they lack the ability to precisely regulate boost pressure to a user-defined level. Vacuum and exhaust-based actuators can only respond to pre-set pressure points and cannot actively adjust to maintain a steady pressure. Electromagnetic clutches provide only basic on/off control. There is a need for a supercharger control system that allows the user to set a desired boost level and precisely maintain that pressure for optimal engine performance.

The primary objective of the present invention is to provide an electronic supercharger pressure control system that allows user-adjustable boost pressure and maintains the set pressure level precisely. Additional objectives include: replacing imprecise vacuum and exhaust actuators with an electronic servo system; providing closed-loop control of boost pressure using a manifold pressure sensor for feedback; allowing the user to easily adjust the desired boost pressure; protecting the engine by relieving excess boost if manifold pressure exceeds a safe threshold The present invention provides several advantages over prior art supercharger control systems. The use of an electronic servo actuator controlled by a feedback loop allows boost pressure to be regulated to within 1 PSI of the user-set level, far more precisely than vacuum-based systems. The user interface allows drivers to easily adjust the desired boost on the fly to suit performance needs.

SUMMARY

The present invention is directed to an electronic supercharger pressure control system that precisely regulates boost pressure to a user-defined level. The system comprises an electronic servo actuator coupled to a supercharger pressure relief valve, a manifold air pressure sensor, a user input device with a potentiometer knob and button, and an electronic control unit.

The electronic control unit receives a manifold air pressure signal from the sensor and determines the current manifold air pressure. It also receives a desired boost pressure level set by the user via the potentiometer knob. The control unit compares the current and desired pressures and controls the electronic servo actuator to adjust the pressure relief valve position to maintain the desired boost pressure within a predetermined range.

If the manifold air pressure drops below a predetermined threshold, the control unit fully opens the pressure relief valve. The user can also rapidly close the valve by pressing the button when certain intake conditions are met, such as the engine RPM being within a preset range and the intake air temperature below a threshold. The control unit may also receive signals from a throttle position sensor to determine if throttle demand is near 100%, and from a barometric pressure sensor to adjust the predetermined threshold pressure. The user input device can include a display to show the current and desired boost pressures. The control unit can store preset boost levels for the user to select.

The method of controlling the electronic supercharger pressure control system includes the electronic control unit receiving signals from the manifold air pressure sensor and user input device, determining the current manifold air pressure, receiving the desired boost pressure from the user, comparing the current and desired pressures, and controlling the electronic servo actuator to adjust the pressure relief valve to maintain the desired boost level. The method also includes fully opening the valve when manifold pressure drops too low and rapidly closing it when the user presses the button and intake conditions are met.

In summary, the electronic supercharger pressure control system and method of the present invention provide precise, user-adjustable control of supercharger boost pressure using an electronic servo actuator and closed-loop control based on manifold pressure feedback. This allows optimal engine performance tuning while protecting against over-boost conditions.

BRIEF DESCRIPTION OF THE DRAWINGS

FIG. 1 is a schematic diagram illustrating an electronic supercharger pressure control system.

DETAILED DESCRIPTION

Figure 2:
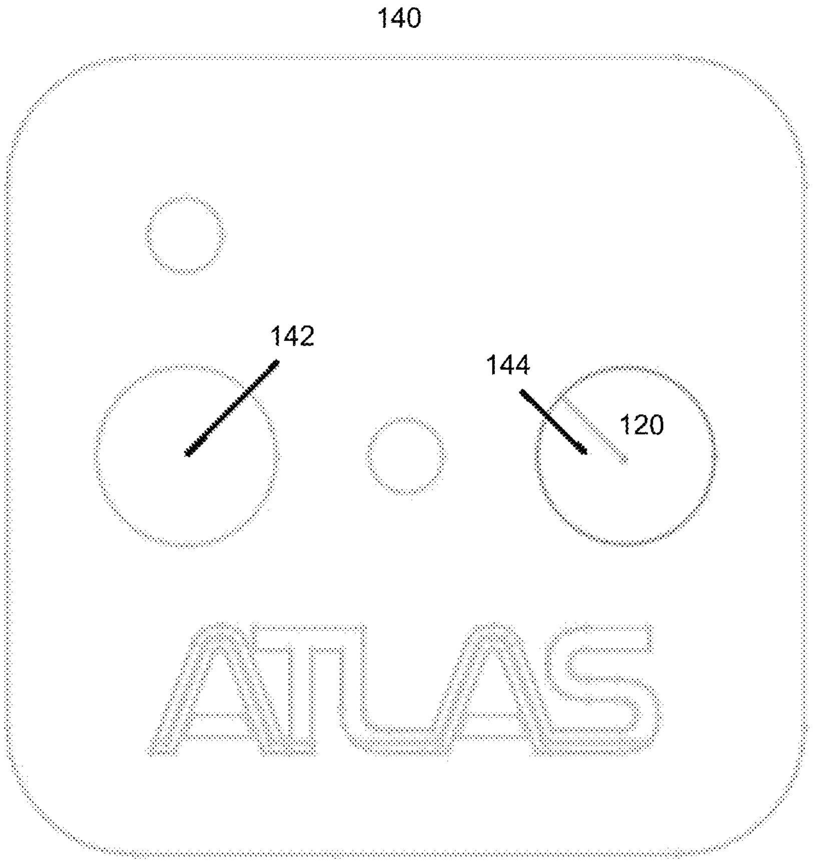
FIG. 2 is a schematic diagram illustrating the user input device.

FIG. 1 is a schematic diagram illustrating an electronic supercharger pressure control system 100 according to an embodiment of the present invention. The system 100 includes an electronic servo actuator 110 operatively coupled to a supercharger pressure relief valve 120. The electronic servo actuator 110 is configured to adjust a position of the supercharger pressure relief valve 120. The system 100 further includes a manifold air pressure sensor 130 configured to measure a manifold air pressure and generate a manifold air pressure signal 132.

A user input device 140 includes a potentiometer knob 142 and a button 144. The potentiometer knob 142 is configured to allow a user to set a desired boost pressure level. The button 144 is configured to allow the user to rapidly close the supercharger pressure relief valve 120 when predetermined intake conditions are met.

In various embodiments an electronic control unit 150 is operatively coupled to the electronic servo actuator 110, the manifold air pressure sensor 130, and the user input device 140. The electronic control unit 150 is configured to receive the manifold air pressure signal 132 from the manifold air pressure sensor 130 and determine a current manifold air pressure based on the manifold air pressure signal 132.

The electronic control unit 150 is further configured to receive the desired boost pressure level from the potentiometer knob 142, compare the current manifold air pressure to the desired boost pressure level, and control the electronic servo actuator 110 to adjust the position of the supercharger pressure relief valve 120 based on the comparison to maintain the desired boost pressure level within a predetermined pressure range.

The electronic control unit 150 is also configured to fully open the supercharger pressure relief valve 120 when the current manifold air pressure drops below a predetermined threshold pressure, and rapidly close the supercharger pressure relief valve 120 when the button 144 is pressed and the predetermined intake conditions are met.

FIG. 2 is a schematic diagram illustrating the user input device 140 of the electronic supercharger pressure control system 100 according to an embodiment of the present invention. The user input device 140 includes the potentiometer knob 142 configured to allow the user to set the desired boost pressure level. Turning the potentiometer knob 142 clockwise increases the desired boost pressure level, while turning it counter-clockwise decreases the desired boost pressure level. The user input device 140 also includes the button 144 configured to allow the user to rapidly close the supercharger pressure relief valve 120 when pressed, provided the predetermined intake conditions are met. The predetermined intake conditions may include factors such as throttle position, engine RPM, intake air temperature, etc. The user input device 140 may further include a display 146 configured to display the current manifold air pressure and the desired boost pressure level.

Figure 3:
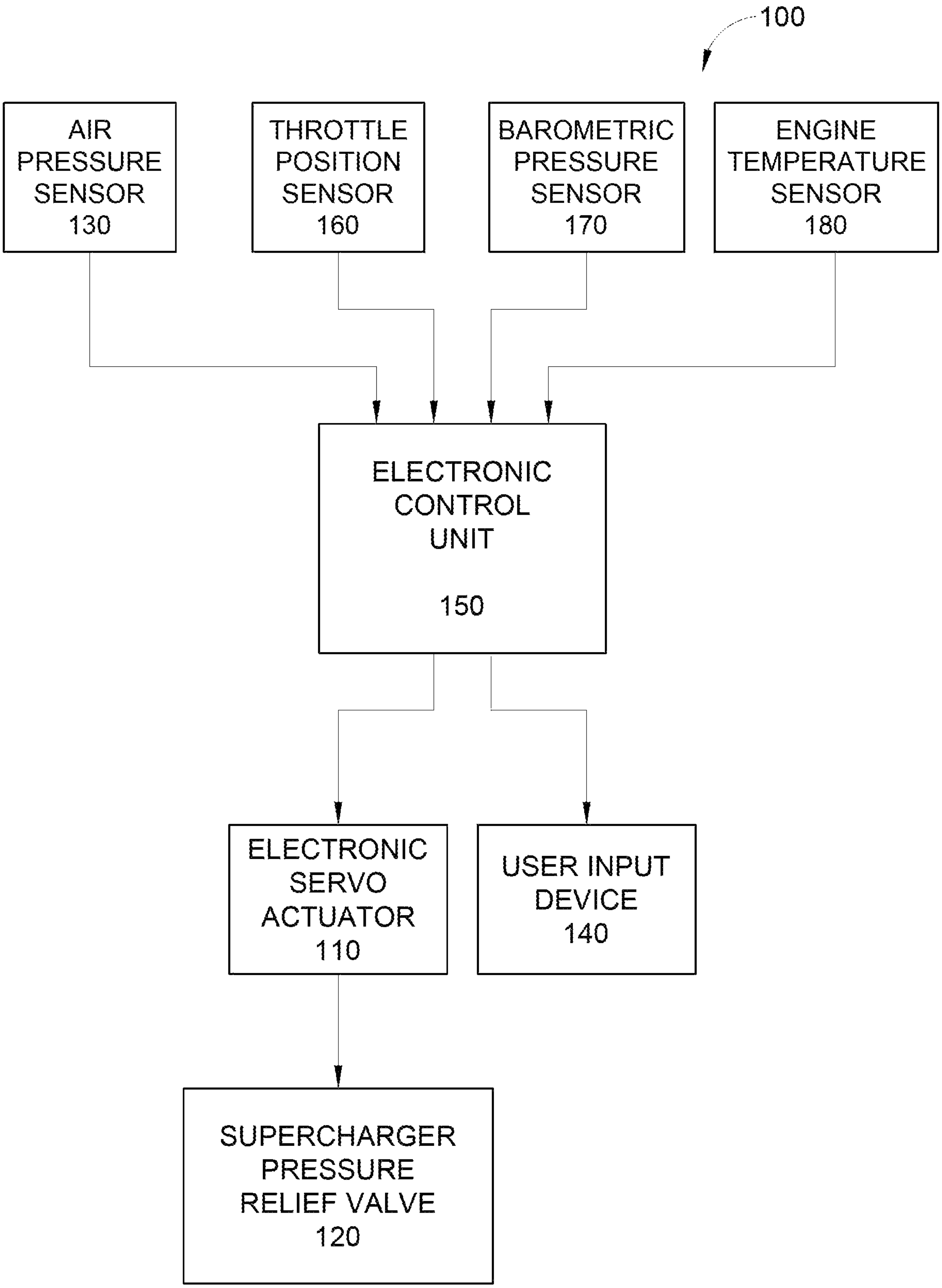
FIG. 3 is a system overview diagram illustrating the key components of the electronic supercharger pressure control system.

FIG. 3 is a system overview diagram illustrating the key components of the electronic supercharger pressure control system 100 and their interconnections according to an embodiment of the present invention. The system 100 includes the electronic control unit 150 which receives signals from various sensors, including the manifold air pressure sensor 130, a throttle position sensor 160, a barometric pressure sensor 170, and an engine temperature sensor 180. The electronic control unit 150 processes the sensor inputs, compares them to set points, and controls the electronic servo actuator 110 to adjust the position of the supercharger pressure relief valve 120. The electronic control unit 150 also interfaces with the user input device 140 to receive user settings and display relevant information. The supercharger 190 is shown within the overall engine system.

Figure 4:
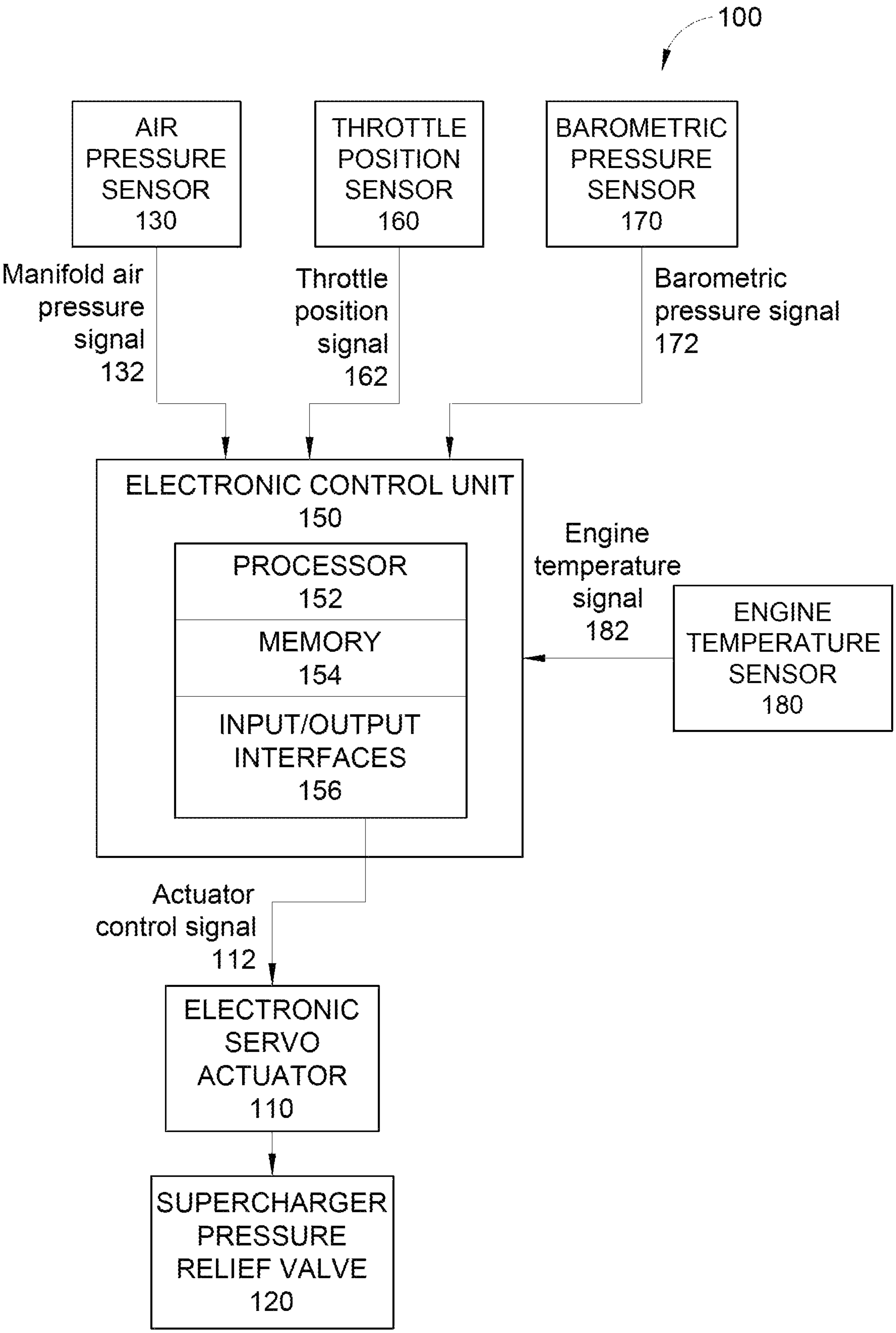
FIG. 4 is a detailed diagram illustrating the electronic control unit.

FIG. 4 is a detailed diagram illustrating the electronic control unit 150 of the electronic supercharger pressure control system 100 according to an embodiment of the present invention. The electronic control unit 150 includes a processor 152, memory 154, and input/output (I/O) interfaces 156. The I/O interfaces 156 are configured to receive sensor signals, such as the manifold air pressure signal 132 from the manifold air pressure sensor 130, a throttle position signal 162 from the throttle position sensor 160, a barometric pressure signal 172 from the barometric pressure sensor 170, and an engine temperature signal 182 from the engine temperature sensor 180. The I/O interfaces 156 are also configured to send control signals, such as an actuator control signal 112, to the electronic servo actuator 110 to adjust the position of the supercharger pressure relief valve 120. The processor 152 executes instructions stored in the memory 154 to perform the various control functions of the electronic supercharger pressure control system 100, such as determining the current manifold air pressure, comparing it to the desired boost pressure level, and controlling the electronic servo actuator 110 accordingly.

The embodiments described above are given for the purpose of facilitating the understanding of the present invention and are not intended to limit the interpretation of the present invention. The respective elements and their arrangements, materials, conditions, shapes, sizes, or the like of the embodiment are not limited to the illustrated examples but may be appropriately changed. Further, the constituents described in the embodiment may be partially replaced or combined together.

What is claimed is:

1. An electronic supercharger pressure control system comprising:

a) an electronic servo actuator operatively coupled to a supercharger pressure relief valve, the electronic servo actuator configured to adjust a position of the supercharger pressure relief valve;

b) a manifold air pressure sensor configured to measure a manifold air pressure;

c) a user input device comprising: a potentiometer knob and a button, the potentiometer knob configured to allow a user to set a desired boost pressure level, and the button configured to allow the user to rapidly close the supercharger pressure relief valve;

d) and an electronic control unit operatively coupled to the electronic servo actuator, the manifold air pressure sensor, and the user input device, the electronic control unit configured to:

i) receive a manifold air pressure signal from the manifold air pressure sensor;

ii) determine a current manifold air pressure based on the manifold air pressure signal;

iii) receive a desired boost pressure level from the potentiometer knob;

iv) compare the current manifold air pressure to the desired boost pressure level;

v) control the electronic servo actuator to adjust the position of the supercharger pressure relief valve based on the comparison to maintain the desired boost pressure level within a predetermined pressure range;

vi) fully open the supercharger pressure relief valve when the current manifold air pressure drops below a predetermined threshold pressure; and vii) rapidly close the supercharger pressure relief valve when the button is pressed and predetermined intake conditions are met.

2. The system of claim 1, wherein the electronic control unit is further configured to: receive a throttle position signal from a throttle position sensor; and determine that the throttle demand is near 100% based on the throttle position signal.

3. The system of claim 1, wherein the predetermined intake conditions comprise: an engine RPM being within a predetermined RPM range; and an intake air temperature being below a predetermined temperature threshold.

4. The system of claim 1, wherein the electronic control unit is further configured to: receive a barometric pressure signal from a barometric pressure sensor; and adjust the predetermined threshold pressure based on the barometric pressure signal.

5. The system of claim 1, wherein the electronic servo actuator comprises a stepper motor.

6. The system of claim 1, wherein the user input device further comprises a display configured to display the current manifold air pressure and the desired boost pressure level.

7. The system of claim 1, wherein the electronic control unit is further configured to: store a plurality of pre-set boost pressure levels; and receive a selection of one of the pre-set boost pressure levels from the user input device.

8. The system of claim 1, wherein the supercharger pressure relief valve is a poppet valve.

9. The system of claim 1, wherein the electronic control unit is further configured to: receive an engine oil temperature signal from an engine oil temperature sensor; and disable adjustment of the supercharger pressure relief valve when the engine oil temperature is outside a predetermined temperature range.

10. A method for controlling an electronic supercharger pressure control system, the method comprising:

a) receiving, by an electronic control unit, a manifold air pressure signal from a manifold air pressure sensor;

b) determining, by the electronic control unit, a current manifold air pressure based on the manifold air pressure signal;

c) receiving, by the electronic control unit, a desired boost pressure level from a potentiometer knob configured to allow a user to set the desired boost pressure level;

d) comparing, by the electronic control unit, the current manifold air pressure to the desired boost pressure level;

e) controlling, by the electronic control unit, an electronic servo actuator operatively coupled to a supercharger pressure relief valve to adjust a position of the supercharger pressure relief valve based on the comparison to maintain the desired boost pressure level within a predetermined pressure range;

f) fully opening, by the electronic control unit, the supercharger pressure relief valve when the current manifold air pressure drops below a predetermined threshold pressure;

g) and rapidly closing, by the electronic control unit, the supercharger pressure relief valve when a button configured to allow the user to rapidly close the supercharger pressure relief valve is pressed and predetermined intake conditions are met.

11. The method of claim 10, further comprising: receiving, by the electronic control unit, a throttle position signal from a throttle position sensor; and determining, by the electronic control unit, that the throttle demand is near 100% based on the throttle position signal.

12. The method of claim 10, wherein the predetermined intake conditions comprise: an engine RPM being within a predetermined RPM range; and an intake air temperature being below a predetermined temperature threshold.

13. The method of claim 10, further comprising: receiving, by the electronic control unit, a barometric pressure signal from a barometric pressure sensor; and adjusting, by the electronic control unit, the predetermined threshold pressure based on the barometric pressure signal.

14. The method of claim 10, wherein the electronic servo actuator comprises a stepper motor.

15. The method of claim 10, further comprising displaying, on a display of the user input device, the current manifold air pressure and the desired boost pressure level.

16. The method of claim 10, further comprising: storing, by the electronic control unit, a plurality of pre-set boost pressure levels; and receiving, by the electronic control unit, a selection of one of the pre-set boost pressure levels from the user input device.

17. The method of claim 10, wherein the supercharger pressure relief valve is a poppet valve.

18. The method of claim 10, further comprising: receiving, by the electronic control unit, an engine oil temperature signal from an engine oil temperature sensor; and disabling, by the electronic control unit, adjustment of the supercharger pressure relief valve when the engine oil temperature is outside a predetermined temperature range.

* * * * *